June 12, 1962 R. M. KLAUS ET AL 3,038,714
TORSIONAL SPRING BALANCE UNIT
Filed May 29, 1961 2 Sheets-Sheet 1
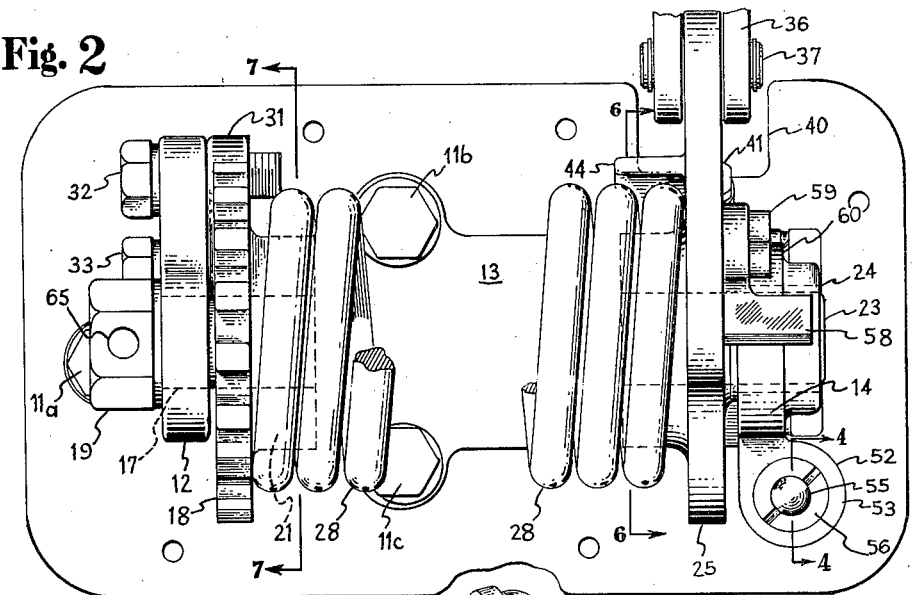
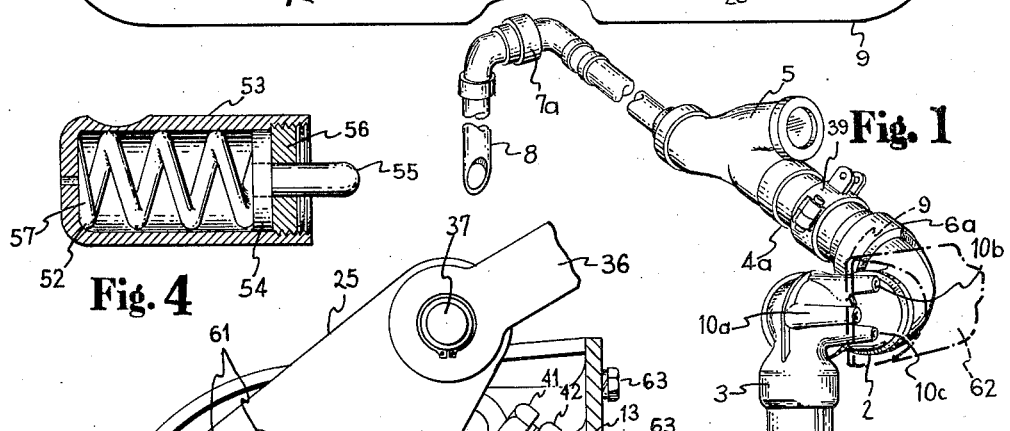
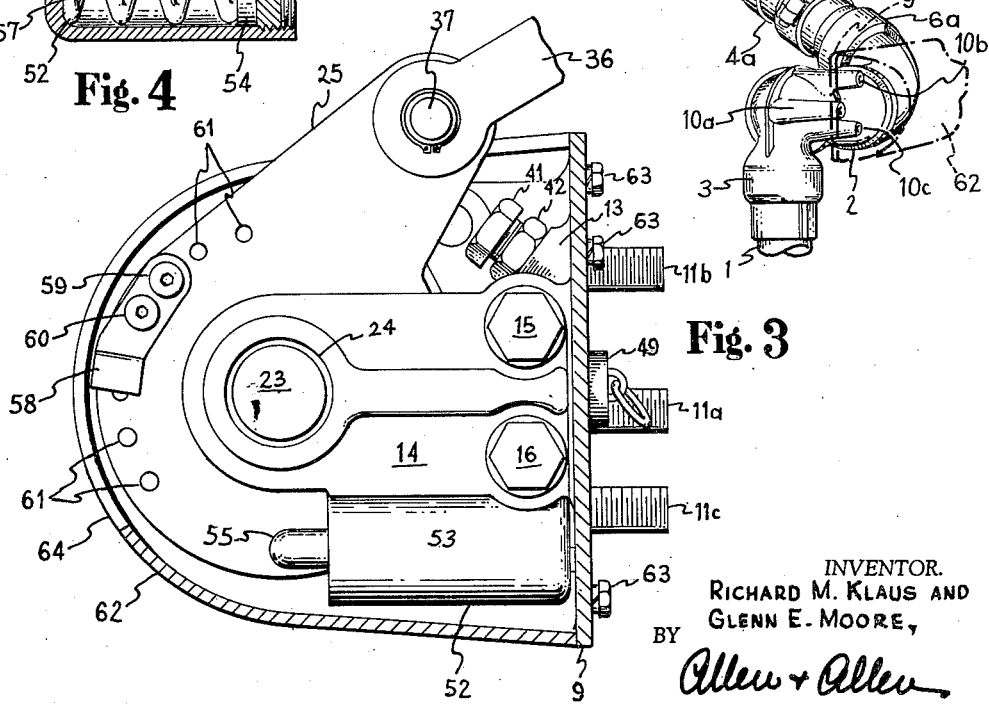
INVENTOR.
RICHARD M. KLAUS AND
GLENN E. MOORE,
BY *Allen + Allen*
ATTORNEYS.

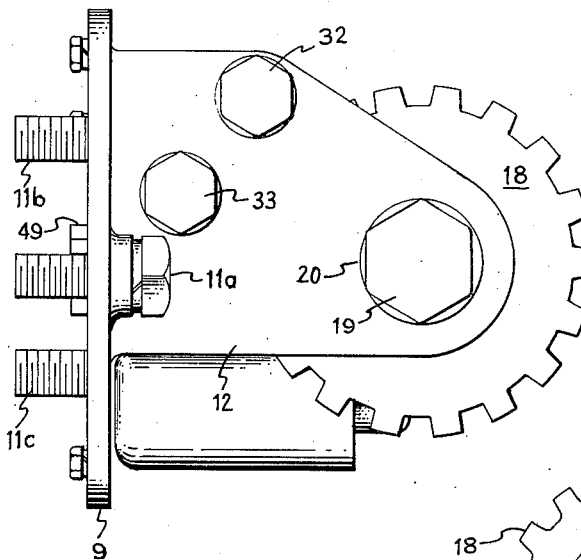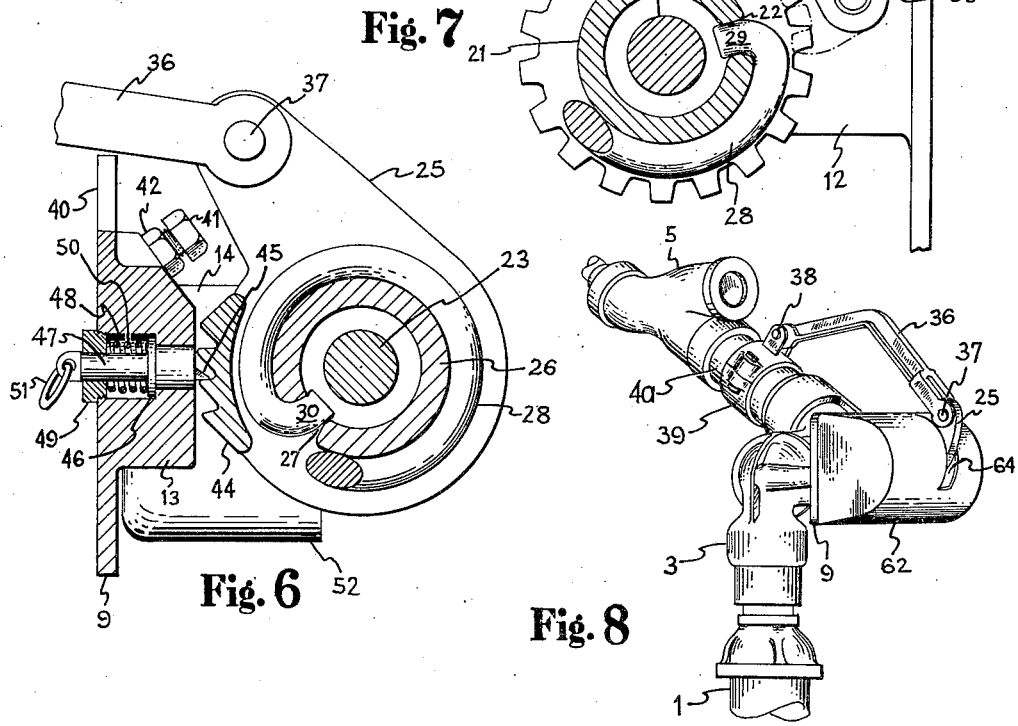

United States Patent Office 3,038,714
Patented June 12, 1962

3,038,714
TORSIONAL SPRING BALANCE UNIT
Richard M. Klaus, Cincinnati, and Glenn E. Moore, Fairfield, Ohio, assignors to Dover Corporation, Washington, D.C., a corporation of Delaware
Filed May 29, 1961, Ser. No. 113,352
14 Claims. (Cl. 267—1)

The invention relates to a torsion spring assembly for use on such devices as swing arm loading spouts for the transfer of liquids to tank cars and tank trucks. Such swing arm loading spouts are of considerable length and weight, and since they must frequently be handled by one operator it is necessary to provide counterbalancing means which will permit rapid, easy and accurate placement of the end of the spout.

It is an object of the invention to provide improved torsion spring counterbalancing assemblies for such spouts.

It is an object of the invention to provide a torsion spring assembly of simplified and less expensive construction.

It is an object of the invention to provide a torsion spring assembly requiring a minimum of maintenance.

It is an object of the invention to provide a torsion spring assembly in which the torque of the torsion spring may be finely and easily adjusted.

It is an object of the invention to provide a torsion spring balance unit which is small, self-contained and capable of being enclosed by a protective cover.

It is an object of the invention to provide a balance unit which may readily be disassembled and reassembled for replacement or repair.

These and other objects of the invention which will be set forth hereinafter or will be apparent to one skilled in the art upon reading these specifications, are accomplished by that structure and arrangement of parts of which an exemplary embodiment will now be described. Reference is made to the accompanying drawings wherein:

FIG. 1 is a perspective view of a swing arm loading spout with the support plate of the torsional spring balance unit indicated by dotted lines.

FIG. 2 is a front elevation of the torsional spring balance unit without its protective cover and with the torsion spring partially cut away.

FIG. 3 is an end elevation with the protective cover partially cut away, taken from the right end of FIG. 2.

FIG. 4 is a sectional view of the snubber device taken along the section line 4—4 of FIG. 2.

FIG. 5 is a partial end elevation taken from the left end of FIG. 2.

FIG. 6 is a cross-sectional view taken along the section line 6—6 of FIG. 2.

FIG. 7 is a cross-sectional view taken along the section line 7—7 of FIG. 2.

FIG. 8 is a partial perspective view of the swing arm loading spout with the torsional spring balance unit in place.

The torsional spring balance unit of this invention may be used on a variety of commercial swing arm loading spouts. FIG. 1 illustrates one such spout. A vertical pipe 1 is connected to a horizontal pipe member by means of a swivel joint 3 allowing for the horizontal swinging of the pipe member 2. The pipe member 2 is in turn joined to a swing arm 4a with a loading valve 5, by means of a swivel joint 6a, enabling vertical rotation of the swing arm. The swing arm 4a is connected by means of a swivel joint 7a to a spout member 8 which remains in an essentially vertical position during manipulation of the swing arm loading spout and thus can be caused to enter the filler opening of the container to be filled.

The torsional spring balance unit of this invention is mounted on a support plate 9 which is indicated by dotted lines in FIG. 1. The horizontal pipe member 2 is provided with three lugs 10a, 10b and 10c to which the support plate 9 is fixed by the bolts 11a, 11b and 11c (see FIG. 2).

The support plate 9 bears near its left end a bracket 12, either as an integral part of the support plate, or welded thereto. The support plate 9 has a raised portion 13 (see FIGS. 2 and 6) near its right end, to which is affixed a second bracket 14 by means of the bolts 15 and 16 (FIG. 3).

A stub shaft 17 is rotatably mounted in the bracket 12. A toothed wheel 18 (hereinafter referred to as the spring regulator) is mounted on the shaft 17 in such a way as to rotate with the shaft. The spring regulator 18 may be keyed or pinned to the shaft 17, or it may be welded to it or made integral. The other end of the stub shaft 17 is configured in the shape of an adjusting head 19.

The side of the spring regulator 18 that faces away from the bracket 12, has an annular raised portion or hub 21 with a break or slot 22 therein (see FIG. 7).

The bracket 14 supports a stub shaft 23 in a bearing 24. A disc-shaped member with an upwardly extending arm portion (hereinafter referred to as the spring arm 25) is mounted on the shaft 23 in such a way as to rotate with it. The mounting of the spring arm 25 to the shaft 23 may be accomplished by any suitable means such as those outlined above for the mounting of the spring regulator 18 to the shaft 17.

The side of the spring arm 25 that faces away from the bracket 14 has an annular raised portion or hub 26 with a break or slot 27 therein.

A torsion spring 28 is supported between the spring regulator 18 and the spring arm 25 on the hubs 21 and 26 respectively. The ends 29 and 30 of the torsion spring 28 are bent over in such a way as to fit into the slots 22 and 27 of the hubs 21 and 26 respectively. The torsion spring is supported wholly by the hubs, and each end of the torsion spring is anchored to its respective hub.

A spring regulator keeper 31 is fastened to the bracket 12 by means of keeper bolts 32 and 33. The keeper 31 has two extensions 34 and 35 shaped and spaced so as to engage the teeth of the spring regulator 18, whereby to hold the spring regulator in fixed position with respect to the bracket 12. The keeper is so shaped and provided with holes for the bolts 32 and 33 that, when removed and reversed, it will provide for half-tooth adjustment as shown in dotted lines in FIG. 7.

The spring arm 25 is connected to the swing arm 4 of the loading spout by means of a link 36 which is pivotally connected to the spring arm 25 by means of the pivot pin 37. The other end of the link 36 is pivotally connected by means of the pivot pin 38 to ears on an adjustable clamp 39 on swing arm 4a. This provides for the regulation of the lifting efficiency of the spring to optimum values for different loads. A notch 40 is provided in the support plate 9 to provide sufficient clearance for the link 36 when the swing arm 4a is in its lowest position. The lowest position the swing arm 4a may attain is adjustable by means of the stop screw 41, having a locking nut 42, on the raised portion 13 of the support plate 9 (see FIGS. 3 and 6). The stop screw 41 provides an abutment to prevent further rotation of the spring arm 25 in a clockwise direction in FIG. 3, and thus limits further lowering of the swing arm loader.

The spring arm 25 is provided with a toothed member 44 which may be an integral part of the spring arm or bolted or welded thereto. The toothed member 44 is engaged by a latch 45 on a plunger 46 with a shaft 47, located in a bore 48 in the enlarged portion 13 of the support plate 9. There is a keeper 49 threaded into the end of the bore and perforated for the passage of the shaft. A compression spring 50 engages between the keeper and the plunger. When the swing arm 4a is lowered it may be locked in various positions by coaction of the latch 45 with the teeth of the toothed member 44. To release the swing arm 4a from its downward position, the latch 45 may be disengaged from the toothed member 44 by pulling on a ring 51 or other similar pull device affixed to the shaft 47. The torsion spring 28 will preferably be so adjusted as almost to compensate for the weight of the spring arm loader, leaving a slight tendency in the loader arm to rise. This permits the use of the means just described to hold the loader arm down in an adjusted position rather than leaving it in a suspended condition in which it might rise unexpectedly and break connection with the tank being loaded.

To prevent damage to the torsioned spring balance unit by a violent return of the swing arm 4a when released from its downward position and raised by the operator, a snubber, generally indicated at 52 in FIGS. 2, 3 and 4 is provided. The snubber consists of a cylinder 53, which may be an integral part of the bracket 14 or affixed thereto by any suitable means, and a piston 54. The snubber nose 55 is affixed to the piston 54 and extends through a keeper 56. A compression spring 57 engages between the bottom of the cylinder and the piston.

A snubbing block 58 is affixed to the spring arm 25 by means of the bolts 59 and 60, there being a series of holes 61 in the spring arm so that the position of the snubbing block may be adjusted. Upon release of the latch 45, the upward movement of the swing arm 4a is terminated without substantial shock by the coaction of the snubbing block 58 and the snubber nose 55.

The torsional spring balance unit may be provided with a cover 62 (see FIGS. 3 and 8) to protect it from dirt and the elements. The cover 62 is bolted to the support plate 9 by bolts 63 through holes in the support plate. The cover is provided with an elongated slot 64 to allow free movement of the spring arm 25 and link 36.

It is an advantage of this invention that a number of adjustments may be made in the torsional spring balance unit. It has been pointed out above that the lowest position of the swing arm may be varied by means of the stop screw 41.

The action of the snubber 52 may be increased or decreased by changing the position of the snubbing block 58 on the spring arm 25 by turning the bolts 59 and 60 into any adjacent pair of the holes 61 in the spring arm 25.

To raise the height of the swing arm or to increase the lifting action of the torsion spring 28, the torque of the spring must be increased. This torque is regulated by the position of the spring regulator 18. If the adjusting head 19 is turned in a clockwise direction in FIG. 5, the torque will be increased. If the adjusting head is turned in a counterclockwise direction, torque will be decreased. To make these adjustments, the swing arm 4a is raised to its highest position. The adjusting head 19 is engaged and held in place either by a wrench or an iron bar inserted in a hole 65. The spring keeper 31 is removed by removal of the keeper bolts 32 and 33. The spring regulator 18 may then be turned clockwise or counterclockwise by turning the adjusting head 19 so that the extensions 34 and 35 of the spring keeper 31 may engage any desired adjacent teeth on the spring regulator when the spring keeper and keeper bolts are replaced. As has been explained, if the spring keeper is removed and reversed (as shown in dotted lines) the equivalent of half a tooth adjustment may be made in either direction.

The apparatus of the invention is readily disassemblable for replacement and repair. If, for example, it should be desired to replace the torsion spring, it is only necessary to relieve the tension on the old spring and remove the demountable bracket, whereupon the old spring may be removed and a new one substituted without other disassembly. Moreover, the apparatus is simple and compact, and the provision of a cover not only protects the parts but makes for greater safety in use.

Modifications may be made in the invention without departing from the spirit of it. The invention having been described in a certain exemplary embodiment, what is claimed as new and desired to be secured by Letters Patent is:

1. In a torsional spring balance unit the combination of a support plate, a first bracket and a second bracket projecting in a spaced relationship from the same side of said plate, one at least of said brackets being removably mounted to said support plate, a first stub shaft rotatably mounted in said first bracket, a second stub shaft rotatably mounted in said second bracket in axial alignment with and spaced relationship to said first stub shaft, said first stub shaft carrying a spring regulator of disc form having a hub extending toward said second stub shaft, said hub having a notch, means for holding said spring regulator in adjusted positions with respect to said first bracket, a spring arm having a hub extending toward the first mentioned hub non-rotatably mounted on said second stub shaft, said hub having a notch, and a torsion spring supported by said hubs and extending therebetween, angularly related end portions of said spring being engaged in said notches.

2. The structure claimed in claim 1 wherein means are provided to lock said spring arm in a plurality of positions.

3. The structure claimed in claim 1 wherein means are provided to lock said spring arm in a plurality of positions, said locking means comprising a member on said spring arm providing a plurality of notches and a resiliently actuated latch mounted in a fixed position with respect to said support plate for engaging said notches.

4. The structure claimed in claim 1 wherein means are provided to lock said spring arm in a plurality of positions, said locking means comprising a member on said spring arm providing a plurality of notches and a resiliently actuated latch mounted in a fixed position with respect to said support plate for engaging said notches and an adjustable stop means on said support plate to limit the motion of said spring arm.

5. The structure claimed in claim 1 including adjustable snubbing means to dampen the movement of said spring arm at the end of its travel in one direction.

6. The structure claimed in claim 1 including adjustable snubbing means to dampen the movement of said spring arm at the end of its travel in one direction, wherein said snubbing means comprises a spring actuated member mounted in a cylinder affixed to said second bracket, and an abutment means adjustable on said spring arm.

7. The structure claimed in claim 1 wherein said spring regulator comprises a toothed wheel and said means for holding said spring regulator in adjusted positions comprises a toothed means engaging the teeth on said spring regulator to prevent its rotation, and means holding said last mentioned means to said first bracket in either of reversed positions, said holding means acting asymmetrically on said toothed means so as to vary the positions of the teeth thereon with respect to said spring regulator depending upon the position of said toothed means.

8. The structure claimed in claim 1 wherein an adjustment head is affixed to the free end of said first stub shaft for engagement by a tool to aid in turning said first stub shaft in adjusting said spring regulator.

9. The structure claimed in claim 8 wherein said spring regulator comprises a toothed wheel and said means for holding said spring regulator in adjusted positions comprises a toothed means engaging the teeth on said spring regulator to prevent its rotation, and means holding said last mentioned means to said first bracket in either of reversed positions, said holding means acting asymmetrically on said toothed means so as to vary the positions of the teeth thereon with respect to said spring regulator depending upon the position of said toothed means, there being a hole in the side of said adjustment head for engagement of a bar to aid in turning said first stub shaft and adjusting said spring regulator.

10. The structure claimed in claim 1 wherein a notch is provided in said support plate in such position as to provide clearance for the downswing of said spring arm.

11. The structure claimed in claim 1 wherein a cover means is affixed to said support plate to protect the above mentioned combination, a slot being provided in said cover means and so located as to provide clearance of said cover for said spring arm.

12. In a torsional spring balance unit, the combination of a support plate, a first bracket and a second bracket projecting in spaced relationship from the same side of said plate, at least one of said brackets being removably mounted to said support plate, a first stub shaft rotatably mounted in said first bracket, a second stub shaft rotatably mounted in said second bracket in axial alignment with and spaced relationship to said first stub shaft, said first stub shaft carrying a spring regulator of disc form having a hub extending toward said second stub shaft, said hub having a notch, said spring regulator having peripheral teeth, toothed means for holding said spring regulator in adjusted positions with respect to said first bracket, a spring arm having a hub extending toward the first mentioned hub non-rotatably mounted on said second stub shaft, said hub having a notch, locking means for said spring arm comprising a member on said spring arm providing a plurality of notches, a resiliently actuated latch mounted in a fixed position with respect to said support plate engaging said notches, adjustable snubbing means to dampen the movement of said spring arm at the end of its travel in one direction, adjustable means on said base for limiting the movement of said spring arm in the other direction, and a torsion spring supported by said hubs and extending therebetween, angularly related end portions of said spring being engaged in said notches.

13. The structure claimed in claim 12 wherein said adjustable means on said base comprises a screw and lock nut.

14. The structure claimed in claim 12 wherein a link is provided for connecting said spring arm to a pivoted member to be balanced, said link being pivoted at one end to said arm, and having at its other end an adjustable clamp.

References Cited in the file of this patent

UNITED STATES PATENTS 2,739,779     Krone et al. _____ Mar. 27, 1956